(12) United States Patent
Baek et al.

(10) Patent No.: US 10,965,129 B2
(45) Date of Patent: Mar. 30, 2021

(54) MOBILE MICRO-GRID UNIT AND MICRO-GRID SYSTEM

(71) Applicant: KOREA INSTITUTE OF ENERGY RESEARCH, Daejeon (KR)

(72) Inventors: Jongbok Baek, Daejeon (KR); Yujin Song, Daejeon (KR); Suyong Chae, Daejeon (KR); Moses Kang, Jeonju-si (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 344 days.

(21) Appl. No.: 16/110,817

(22) Filed: Aug. 23, 2018

(65) Prior Publication Data
US 2020/0067318 A1 Feb. 27, 2020

(51) Int. Cl.
*H02J 3/40* (2006.01)
*H02J 3/38* (2006.01)
*G05B 19/042* (2006.01)
*H02J 9/06* (2006.01)

(52) U.S. Cl.
CPC ............ *H02J 3/40* (2013.01); *G05B 19/042* (2013.01); *H02J 3/383* (2013.01); *H02J 9/062* (2013.01); *G05B 2219/2639* (2013.01)

(58) Field of Classification Search
CPC .... H02J 3/00; H02J 9/00; Y04S 10/00; Y02E 40/00
See application file for complete search history.

(56) References Cited

U.S. PATENT DOCUMENTS

| | | | | |
|---|---|---|---|---|
| 8,588,991 B1* | 11/2013 | Forbes, Jr. | ................ | H02J 3/00 700/295 |
| 9,899,867 B2* | 2/2018 | Brhlik | ........................ | H02J 1/12 |
| 2007/0273210 A1* | 11/2007 | Wang | ........................ | H02J 4/00 307/45 |
| 2013/0041516 A1* | 2/2013 | Rockenfeller | ............ | H02J 3/38 700/287 |
| 2014/0049229 A1* | 2/2014 | Li | ........................... | H02J 3/381 322/39 |
| 2014/0097683 A1* | 4/2014 | Piyabongkarn | ........... | H02J 3/46 307/26 |
| 2015/0318705 A1* | 11/2015 | Lucas | ..................... | H02J 3/386 307/129 |
| 2017/0331325 A1* | 11/2017 | Ristau | ....................... | H02J 3/14 |
| 2018/0183085 A1* | 6/2018 | Mermelstein | ....... | H01M 8/0494 |

FOREIGN PATENT DOCUMENTS

| | | |
|---|---|---|
| KR | 10-2014-0015745 A | 2/2014 |
| KR | 10-2014-0060401 A | 5/2014 |
| KR | 10-2014-0100671 A | 8/2014 |

* cited by examiner

*Primary Examiner* — Rexford N Barnie
*Assistant Examiner* — Joseph N Inge
(74) *Attorney, Agent, or Firm* — Birch, Stewart, Kolasch & Birch, LLP

(57) ABSTRACT

The present disclosure related to a mobile micro-grid unit and a micro-grid system. An aspect of the present embodiment provides a mobile micro-grid system including: two or more movable micro-grid units configured to receive energy from an energy source so as to supply the energy to an internal power line and configured to provide energy of the internal power line to loads; and external power lines configured to be connected between the micro-grid units, wherein the external power lines are connected to each other through the internal power lines so as to form a closed-loop type ring bus.

16 Claims, 13 Drawing Sheets

MOBILE MICRO-GRID UNIT AND MICRO-GRID SYSTEM

BACKGROUND OF THE INVENTION

1. Field of the invention

The present disclosure relates to a mobile micro-grid unit and a micro-grid system.

2. Description of the Prior Art

A micro-grid system, unlike an existing power system that delivers electricity generated from a power plant to consumers in one direction, has local power generation and storage facilities based on independent distributed power sources so that power consumers can generate, store, and consume power. The micro-grid system can attain independent energy self-sufficiency using multiple distributed power sources, and can configure an energy network that can be associated with existing power systems as necessary.

In the micro-grid system, the power consumers may produce and supply power, and may build a power network in a specific-scale area, thereby maximizing the efficiency of surplus power generated. Since the power generation sources are dispersed in the micro-grid system, power can be supplied stably and the efficiency can be further improved through combination with renewable energy. The micro-grid systems may be classified into a residential system, a small commercial system, a commercial system, and the like depending on the amount of power to be handled, and may be divided into a military system, a campus system, a community system, and the like depending on usage thereof.

The micro-grid system is similar to a Smart Grid, but differs in that separate power transfer facilities are not required because the distance between the power generator and the power consumer is short and the scale of application is small.

Although the micro-grid systems have drawn a lot of attention due to various advantages thereof, conventional micro-grid systems are mostly fixed types installed in a specific place, and there is no research on a mobile micro-grid system that is movable. Applications, such as military purposes, require movement of the micro-grid system, and thus, it is necessary to configure an efficient mobile micro-grid system and to operate the same stably for the above applications.

SUMMARY OF THE INVENTION

The embodiments of the present disclosure can provide a mobile micro-grid system that enables easy construction of a movable system, operates stably, and improves fuel consumption efficiency of a generator, and can further provide a micro-grid unit for the same.

An aspect of the present embodiment provides a mobile micro-grid system including: two or more movable micro-grid units configured to receive energy from an energy source so as to supply the energy to an internal power line and configured to provide energy of the internal power line to loads; and external power lines configured to be connected between the micro-grid units, wherein the external power lines are connected to each other through the internal power lines so as to form a closed-loop type ring bus.

In the micro-grid system, the micro-grid unit may be provided with two power line connecting portions configured to be connected with the external power line, and the internal power line may connect the two power line connecting portions to each other.

In the micro-grid system, the two power line connecting portions may be connected to different external power lines, respectively.

In the micro-grid system, the micro-grid unit may be configured to convert the energy supplied from the energy source to DC, to convert the same to AC, and to then supply the same to the internal power line.

In the micro-grid system, the micro-grid unit may include: a diesel AC/DC converter configured to receive energy from a diesel generator and to provide the same to a DC bus; a photovoltaic DC/DC converter configured to receive energy from a photovoltaic generator and to provide the same to the DC bus; an ESS DC/DC converter configured to transfer energy between an energy storage device and the DC bus in both directions; and a bus DC/AC converter configured to transfer energy between the DC bus and the internal power line.

The micro-grid system may further include a central power controller configured to manage power of the entire system.

In the micro-grid system, the central power controller may calculate a target phase difference between a power-sending micro-grid unit and a power-receiving micro-grid unit, and may transmit an instruction on the phase to the power-sending and power-receiving micro-grid units when it is determined that power transfer between the micro-grid units is required.

In the micro-grid system, the central power controller may calculate the target phase difference by determining the power-sending micro-grid unit and the power-receiving micro-grid unit, calculating a current operation point on a power circle diagram using information on a sending-end voltage of the power-sending micro-grid unit, a receiving-end voltage of the power-receiving micro-grid unit, and line impedance between the sending end of the power-sending micro-grid unit and the receiving end of the power-receiving micro-grid unit; setting a target operation point on the power circle diagram based on the magnitude of effective power to be transferred from the power-sending micro-grid unit to the power-receiving micro-grid unit; and calculating the target phase difference between a power-sending end of the power-sending micro-grid unit and a power-receiving end of the power-receiving micro-grid unit based on the target operation point.

In the micro-grid system, the central power controller may be configured to compare the current operation point with the target operation point on the power circle diagram at a predetermined period of time interval and to transmit an instruction on the phase to the power-sending and power-receiving micro-grid units.

In the micro-grid system, the respective micro-grid units may be connected to diesel generators, and the central power controller may transmit an instruction on the amount of power generation of each diesel generator to the micro-grid units.

In the micro-grid system, the central power controller may be configured to: predict the amount of power generation of renewable generators and the amount of load power in the entire system; calculate the total amount of power generation of the diesel generators based on the amount of power generation and the amount of load power, which have been predicted; and determine distribution for the amount of power generation of each diesel generator of the micro-grid units in consideration of power generation efficiency of each diesel generator.

Another aspect of the present embodiment provides a mobile micro-grid unit including: an energy source connecting portion configured to be connected to an energy source; an energy source power converter configured to convert and transfer power between the energy source and a DC bus; two power line connecting portions configured to be connected to an external power line; an internal power line configured to be connected between the two power line connecting portions; a bus DC/AC converter configured to transfer power between the DC bus and the internal power line; and a load connecting portion configured to be connected to the internal power line so as to supply power to loads.

In the micro-grid unit, the energy source connecting portion may include: a diesel connecting portion configured to be connected to a diesel generator; a photovoltaic connecting portion configured to be connected to a photovoltaic generator; and an ESS connecting portion configured to be connected to an energy storage device.

In the micro-grid unit, an energy source power converter configured to provide power supplied from the energy source to a DC bus may include: a diesel AC/DC converter configured to be connected between the diesel connecting portion and the DC bus; a photovoltaic DC/DC converter configured to be connected between the photovoltaic connecting portion and the DC bus; and an ESS DC/DC converter configured to transfer energy between the ESS connecting portion and the DC bus in both directions.

In the micro-grid unit, the load connecting portion may include: a three-phase load connecting portion configured to be connected to a three-phase AC load; a single-phase load connecting portion configured to be connected to a single-phase AC load; and a DC load connecting portion configured to be connected to a DC load.

In the micro-grid unit, an AC/DC converter may be disposed between the internal power line and the DC load connecting portion.

The micro-grid unit may be connected to another micro-grid unit via an external power line connected to the power line connecting portion.

The micro-grid unit may further include a power management unit configured to receive an instruction on power control from an external central power controller and configured to control the bus DC/AC converter.

In the micro-grid unit, the power management unit may be configured to receive an instruction on the voltage phase from the central power controller and configured to control the bus DC/AC converter such that the voltage phase of the internal power line conforms to the instruction on the voltage phase of the central power controller.

In the micro-grid unit, the energy source may include a diesel generator, and the power management unit may be configured to receive an instruction on the amount of power generation of the diesel generator from the central power controller and configured to transmit, to the diesel generator, information on the amount of power generation.

According to the embodiment of the present disclosure, it is possible to provide a mobile micro-grid system that enables easy construction of a movable system, operates stably, and improves fuel consumption efficiency of a generator.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
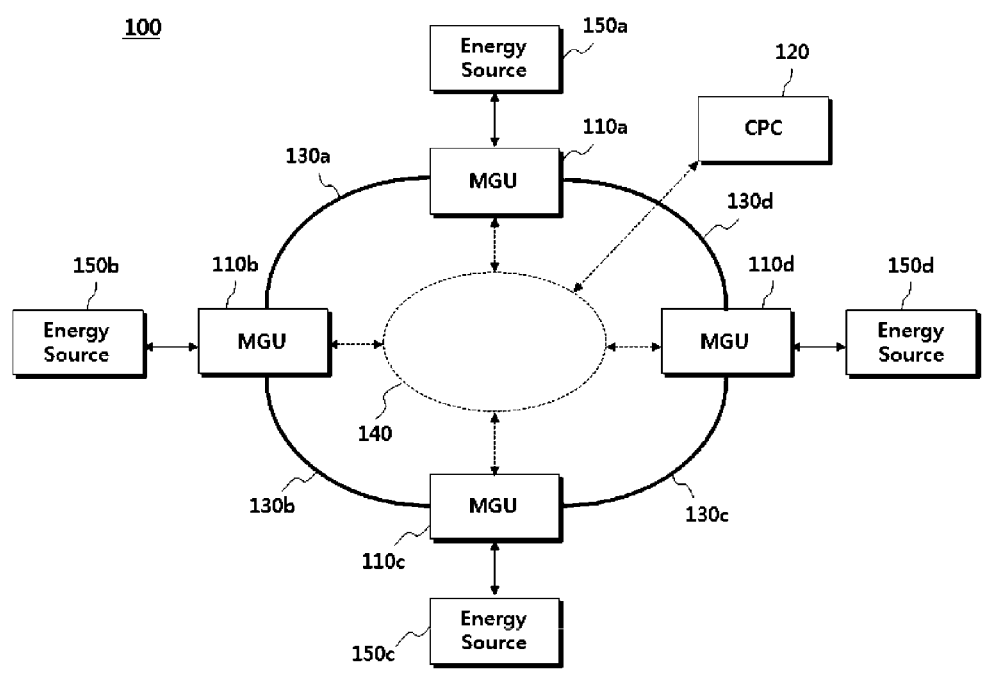
FIG. 1 is a schematic diagram illustrating a micro-grid system according to an embodiment.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a schematic diagram illustrating a micro-grid system according to an embodiment.

Referring to FIG. 1, the micro-grid system 100 may include micro-grid units 110a to 110d, energy sources 150a to 150d, a central power controller 120, and external power lines 130a to 130d.

The respective micro-grid units 110a to 110d may receive energy from the corresponding energy sources 150a to 150d to then supply energy to internal power lines (see 119 in FIG. 2), and may provide energy of the internal power lines to loads (not shown). Although FIG. 1 illustrates four micro-grid units 110a to 110d in the micro-grid system 100, the micro-grid system 100 may have various configurations including two or more micro-grid units 110a to 110d.

The external power lines 130a to 130d may be connected between the micro-grid units 110a to 110d. That is, the external power lines 130a to 130d may connect the micro-grid units 110a to 110d to each other, and may be used to transfer power between the micro-grid units 110a to 110d. The external power lines 130a to 130d may be connected to each other via internal power lines of the micro-grid units 110a to 110d, thereby forming a closed-loop type ring bus. For example, the external power line 130a may connect the micro-grid unit 110a and the micro-grid unit 110b, the external power line 130b may connect the micro-grid unit 110b and the micro-grid unit 110c, the external power line 130c may connect the micro-grid unit 110c and the micro-grid unit 110d, and the external power line 130d may connect the micro-grid unit 110d and the micro-grid unit 110a.

The respective energy sources 150a to 150d may be connected to the corresponding micro-grid units 110a to 110d so as to supply energy (power) thereto. In the case where the energy source 150 is an energy storage device, the energy source 150 may receive and store energy from the micro-grid units 110a to 110d. For example, the energy source 150 may selectively include at least one of a diesel generator that is supplied with fuel and generates power, a renewable generator that generates power using sunlight or wind, or an energy storage device such as a battery (ESS).

The central power controller 120 may manage the power of the entire micro-grid system 100. For example, the central power controller 120 may selectively perform functions of estimating the amount of power generation of generators in the micro-grid system 100, estimating the amount of load power consumed by loads, controlling power transfer between the micro-grid units 110a to 110d, managing accidents, and managing optimized operation for reducing diesel fuel consumption. To this end, the central power controller 120 may be connected to the micro-grid units 110a to 110d via a communication network 140, thereby collecting information on the micro-grid units 110a to 110d and the energy sources 150a to 150d. For example, the communication network 140 may be configured as Ethernet, but is not limited thereto.

Figure 2:
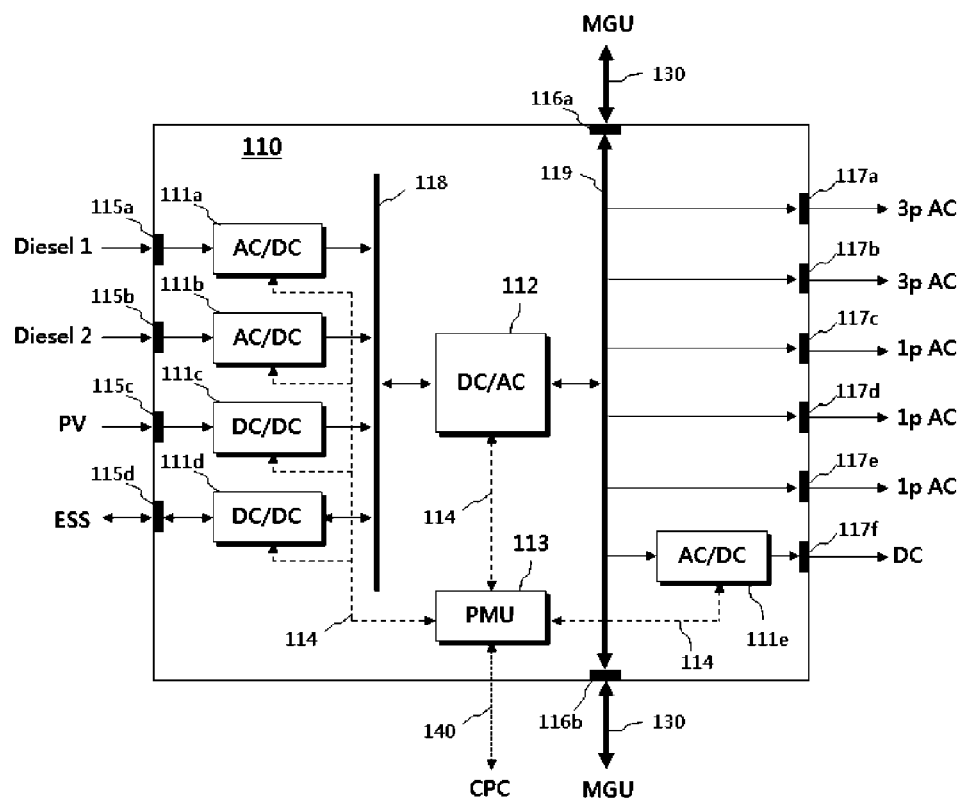
FIG. 2 is a schematic diagram illustrating a micro-grid unit according to an embodiment.

FIG. 2 is a schematic diagram illustrating a micro-grid unit according to an embodiment.

Referring to FIG. 2, the micro-grid unit 110 may include energy source power converters 111a to 111d, a load power converter 111e, a bus DC/AC converter 112, a power management unit 113, energy source connecting portions 115a to 115d, power line connecting portions 116a and 116b, load connecting portions 117a to 117f, a DC bus 118, and an internal power line 119.

The energy source connecting portions 115a to 115d may be connecting terminals for connecting the micro-grid unit 110 to various energy sources (diesel generators, photovoltaic generators, energy storage devices, and the like). For example, the energy source connecting portions 115a to 115d may include connectors for electrical connection with the energy sources. For example, the energy source connecting portions 115a to 115d may include diesel connecting portions 115a and 115b for connection with a diesel generator, a photovoltaic connecting portion 115c for connection with a photovoltaic generator, and an ESS connecting portion 115d for connection with an energy storage device (ESS), but the energy source connecting portions are not limited thereto.

The power line connecting portions 116a and 116b may connect the internal power line 119 to the external power line 130. For example, two power line connecting portions 116a and 116b may be provided, and the power line connecting portions 116a and 116b may be connected to different external power lines 130, respectively. The micro-grid unit 110 may be connected to another micro-grid unit via the external power line 130 connected to the power line connecting portions 116a and 116b, thereby transmitting power to each other.

The load connecting portions 117a to 117f may be connected to the internal power line 119 so as to supply the power of the internal power line 119 to the loads (3p AC, 1p AC, and DC). For example, the load connecting portions may include three-phase load connecting portions 117a and 117b for connection with three-phase AC loads, single-phase load connecting portions 117c, 117d, and 117e for connection with single-phase AC loads, and a DC load connecting portion 117f for connection with a DC load. Although FIG. 2 shows two three-phase load connecting portions 117a and 117b, three single-phase load connecting portions 117c, 117d, and 117e, and one DC load connecting portion 117f, the present embodiment is not limited thereto. The number of load connecting portions depending on the type of load may be properly configured as necessary.

The micro-grid unit 110 may convert the energy supplied from various energy sources to DC to collect the same on the DC bus 118, and may then convert the power of the DC bus 118 back to AC, thereby providing the same to the internal power line 119. The internal power line 119 may connect the two power line connecting portions 116a and 116b to each other. The connection of the internal power line 119 between the two power line connecting portions 116a and 116b makes it possible to connect the external power lines 130 to each other via the internal power line 119, thereby forming a closed-loop type ring bus.

The bus DC/AC converter 112 may transfer power between the DC bus 118 and the internal power line 119. For example, the bus DC/AC converter 112 may convert DC power of the DC bus 118 to AC power, and may provide the same to the internal power line 119. In the case where the energy source includes an energy storage device, such as an ESS, the bus DC/AC converter 112 may convert AC power of the internal power line 119 to DC power, and may provide the same to the DC bus 118, as necessary.

The energy source power converters 111a to 111d may convert the power supplied from various energy sources, thereby providing the same to the DC bus 118. For example, the power converters 111a to 111d may selectively include diesel AC/DC converters 111a and 111b that receive energy from a diesel generator and provide the same to the DC bus 118, a photovoltaic DC/DC converter 111c that receives energy from a photovoltaic generator (PV) and provides the same to the DC bus 118, and an ESS DC/DC converter 111d that transfers energy in both directions between the energy storage device (ESS) and the DC bus 118. The types and number of power converters may be appropriately configured depending on the types and number of energy sources.

The load power converter 111e may convert AC power of the internal power line 119 to DC power, thereby supplying the same to a DC load, between the internal power line 119 and the DC load connecting portion 117f.

The power management unit 113 may receive an instruction for power control from an external central power controller (see 120 in FIG. 1), and may control the power converters 111a to 111e and the bus DC/AC converter 112. For example, the power management unit 113 may receive, from the central power controller, instructions on the voltage magnitude and/or voltage phase of the internal power line 119, and may control the bus DC/AC converter 112 such that the voltage magnitude and/or voltage phase of the internal power line 119 conform to the instruction of the central power controller. For example, the power management unit 113 may receive an instruction on the amount of power generation of each of the diesel generators (Diesel 1 and Diesel 2) from the central power controller, and may transmit information on the amount of power generation to the respective diesel generators (Diesel 1 and Diesel 2).

Figure 3:
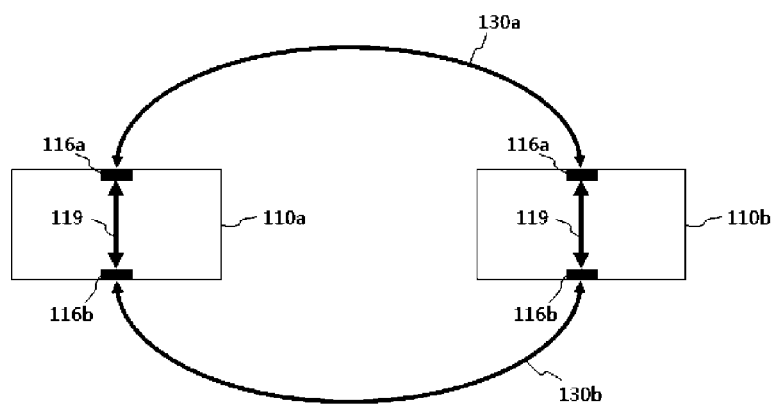
FIG. 3 is a schematic diagram illustrating connection of a power line of a micro-grid system including two micro-grid units.

FIG. 3 is a schematic diagram illustrating connection of a power line of a micro-grid system including two micro-grid units. In FIG. 3, only the internal power line 119 is illustrated in the micro-grid units 110a and 110b and the remaining configurations are omitted for the convenience of explanation.

Referring to FIG. 3, one power line connecting portion 116a of the micro-grid unit 110a may be connected to one power line connecting portion 116a of the micro-grid unit 110b via an external power line 130a, and the other power line connecting portion 116b of the micro-grid unit 110a may be connected to the other power line connecting portion 116b of the micro-grid unit 110b via another external power line 130b. As described above, the external power lines 130a and 130b may be connected to each other through the internal power lines 119 of the micro-grid units 110a and 110b so as to form a closed-loop type ring bus.

Figure 4:
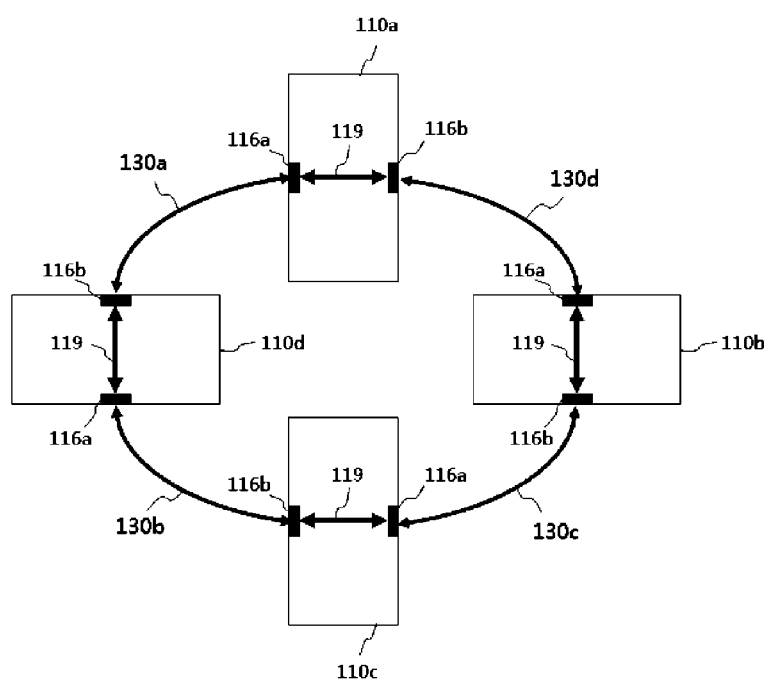
FIG. 4 is a schematic diagram illustrating connection of a power line of a micro-grid system including four micro-grid units.

FIG. 4 is a schematic diagram illustrating connection of a power line of a micro-grid system including four micro-grid units. In the case of FIG. 4, the external power lines 130a to 130d are also connected to each other, similarly to the case of FIG. 3, through the internal power lines 119 of the micro-grid units 110a to 110d, thereby forming a closed-loop ring bus.

As seen from FIGS. 3 and 4, in the case of the present embodiment, a closed-loop type ring bus may be configured by simply connecting the external power line 130 to the power line connecting portion 116 of the micro-grid unit 110, thereby forming a power distribution network in a micro-grid system. Unlike the conventional fixed type micro-grid system in which a power distribution network is pre-configured and the micro-grid units are connected to the power distribution network so as to be divided, a mobile micro-grid system of the present embodiment can be configured by a simple method in which necessary micro-grid units 110 are moved to a desired region and the external power lines 130 are connected to the micro-grid units 110. In addition, according to the present embodiment, since the power distribution network is configured in the form of a ring bus, even if a failure occurs in any one of the paths, it is possible to transfer power via the opposite path, thereby ensuring stable operation of the system. Further, according to the present embodiment, when a micro-grid unit 110 is added to the micro-grid system, which has already been configured, the connection between one end of an external power line 130 and the micro-grid unit 110 can be released and then the micro-grid unit 110 can be added thereto, which facilitates extension of the micro-grid system.

Figure 5:
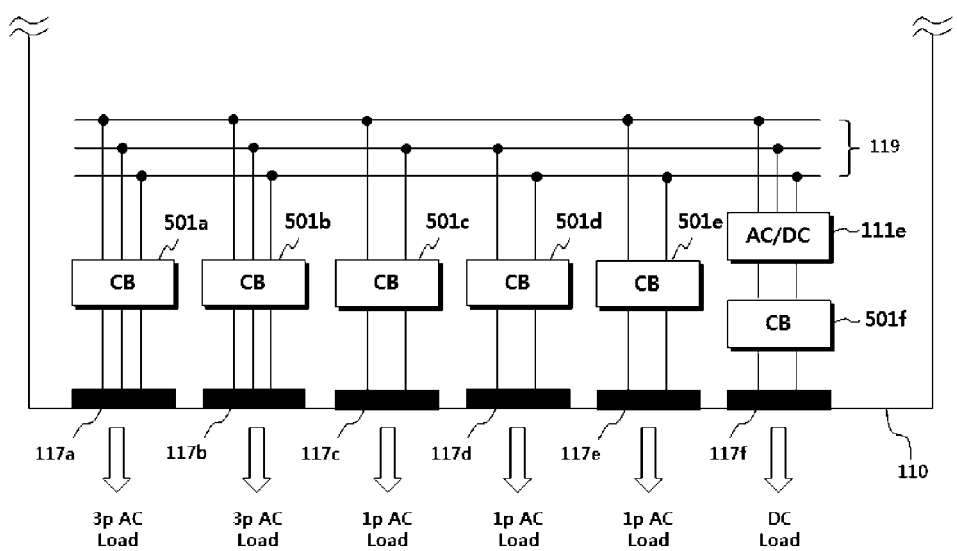
FIG. 5 is a schematic diagram illustrating connection of an internal power line and a load connecting portion of a micro-grid unit according to an embodiment.

FIG. 5 is a schematic diagram illustrating connection of an internal power line and a load connecting portion of a micro-grid unit according to an embodiment. FIG. 5 shows only a configuration related to the connection between the internal power line and the load connecting portion, among the internal configurations of the micro-grid unit 110, for the convenience of explanation.

Referring to FIG. 5, the internal power line 119 may be a three-phase AC line. For example, the three-phase load connecting portions 117a and 117b may be connected to three-phase lines of the internal power line 119 via circuit breakers 501a and 501b, respectively, and three-phase loads (3p AC Load) may be connected to the three-phase load connecting portions 117a and 117b, thereby receiving energy from the internal power line 119. For example, the single-phase load connecting portions 117c, 117d, and 117e may be connected to two of the three-phase lines of the internal power line 119 via circuit breakers 501c, 501d, and 501e, respectively, and single-phase loads (1p AC Load) may be connected to the single-phase load connecting portions 117c, 117d, and 117e so as to receive energy from the internal power line 119. For example, the DC load connecting portion 117f may be connected to the internal power line 119 via the circuit breaker 501f and the DC load AC/DC converter 111e, and a DC load (DC Load) may be connected to the DC load connecting portion 117f, thereby receiving energy from the internal power line 119.

Figure 6:
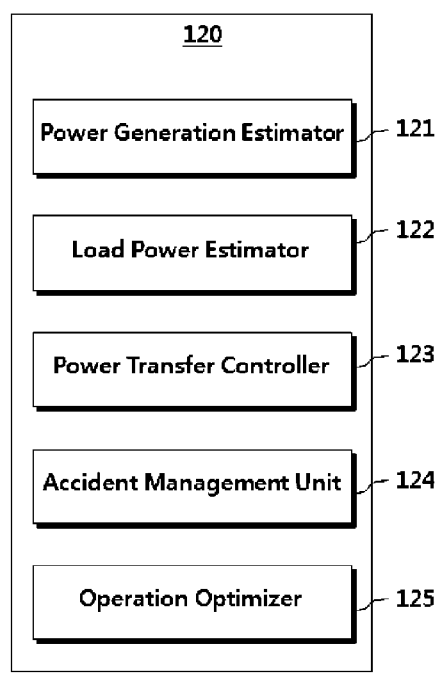
FIG. 6 is a schematic diagram illustrating a central power controller according to an embodiment.

FIG. 6 is a schematic diagram illustrating a central power controller according to an embodiment.

Referring to FIG. 6, the central power controller 120 may include a power generation estimator 121, a load power estimator 122, a power transfer controller 123, an accident management unit 124, and an operation optimizer 125. The central power controller 120 may be implemented as a program or firmware, which operates in a microprocessor, a CPU, a DSP, a system on chip (SoC), or the like.

The power generation estimator 121 may collect information on the generators included in the micro-grid system, and may estimate the amount of power generation of each generator. For example, the micro-grid system may include renewable generators, such as a photovoltaic generator, wind power generator, or the like, and the power generation estimator 121 may estimate the amount of power generation of the renewable generators. To this end, the power generation estimator 121 may utilize weather information and statistical data on the amount of power generation by the renewable generators.

The load power estimator 122 may collect information on loads connected to the micro-grid system, and may estimate the amount of power consumption of the loads. For example, the micro-grid system may have three-phase loads, single-phase loads, and DC loads connected thereto, and the load power estimator 122 may estimate the amount of power of the loads. To this end, the load power estimator 122 may utilize weather information and statistical data on the amount of load power.

The power transfer controller 123 may control the power transfer between the micro-grid units. The central power controller 120 may determine whether or not there is a power shortage in each micro-grid unit by estimating the amount of power generation of each generator and estimating the amount of power of each load. If the amount of load power is greater than the amount of power generation of the generators connected to a micro-grid unit (that is, when the micro-grid unit has a power shortage), the central power controller 120 may determine the power transfer from another micro-grid unit having sufficient power to the micro-grid unit that lacks power. As described above, when it is determined that power transfer is required between the micro-grid units, the power transfer controller 123 may control the power transfer between the micro-grid units. For example, the power transfer controller 123 may control the power transfer between the micro-grid units using a power circle diagram, which will be described in more detail below.

When an accident occurs in any one of the micro-grid units, the accident management unit 124 may control the remaining micro-grid units such that the loads connected to the micro-grid unit in which the accident has occurred can normally operate until the micro-grid unit recovers from the accident. For example, the accident management unit 124 may stop the operation of the micro-grid unit in which the accident has occurred, and may determine that the remaining micro-grid units share the power required for the loads connected to the failed micro-grid unit, thereby controlling the micro-grid units.

The operation optimizer 125 may estimate the amount of power generation of the renewable energy sources and the amount of load power in the entire micro-grid system, may calculate the total amount of power generation of the diesel generators based on the estimated amount of power generation and amount of load power, and may determine distribution of the amount of power generation of each diesel generator of the micro-grid units in consideration of power generation efficiency of each diesel generator. It may be important to operate the diesel generator at optimum efficiency in terms of fuel efficiency because the diesel generator varies in efficiency depending on output. In particular, the fuel efficiency of a mobile micro-grid system used for military purposes is more important because it is directly related to the operational capability. A micro-grid system of the present embodiment provides the central power controller 120 with a function of optimizing the operation of the diesel generator, which will be described in detail below.

As described above, the central power controller 120 may transmit an instruction on power control to the micro-grid units when power transfer between the micro-grid units is required or when an accident occurs. Unless the central power controller 120 directly controls the micro-grid units, the respective micro-grid units may independently perform internal control.

Figure 7:
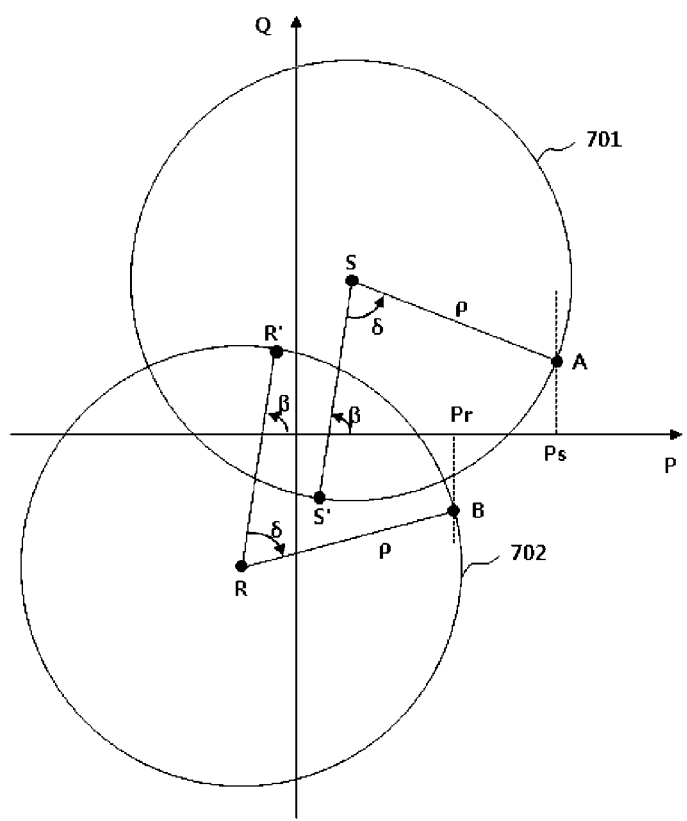
FIGS. 7 to 9 are diagrams explaining power transfer between micro-grid units using a power circle diagram.
Figure 8:
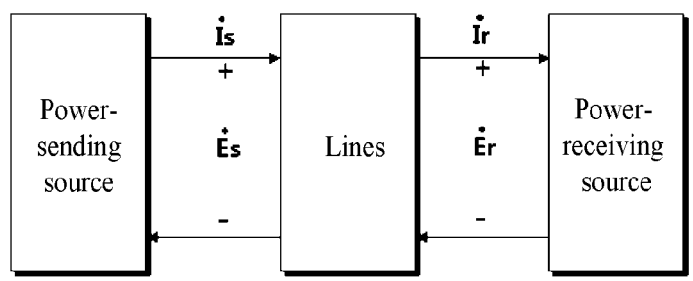
Figure 9:
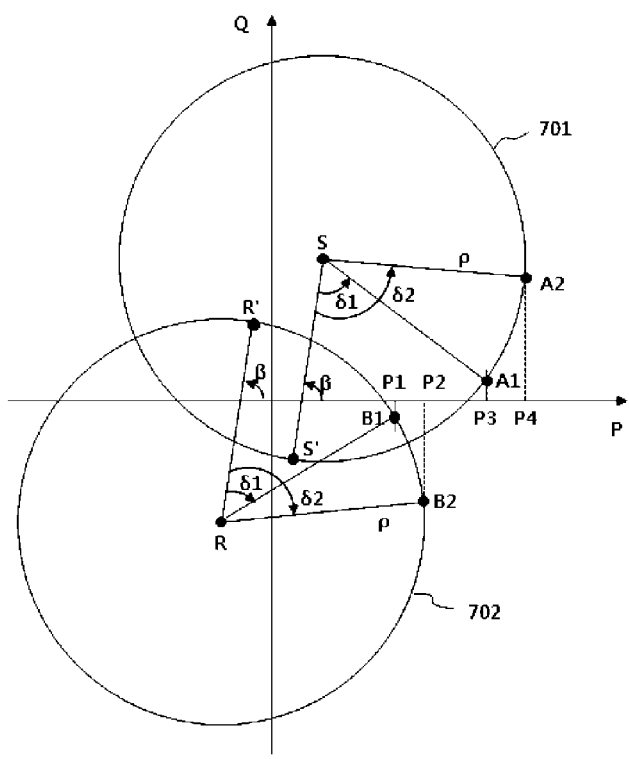

FIGS. 7 to 9 are diagrams explaining power transfer between micro-grid units using a power circle diagram. As described above, the central power controller may control power transfer between the micro-grid units when it is determined to be necessary. In this case, the central power controller may calculate the target phase difference between a power-sending micro-grid unit and a power-receiving micro-grid unit using a power circle diagram, and may transmit an instruction on the phase to the power-sending and power-receiving micro-grid units.

To this end, the central power controller may set a power-sending micro-grid unit and a power-receiving micro-grid unit, may calculate a current operation point on the power circle diagram using information on a sending-end voltage of the power-sending micro-grid unit, a receiving-end voltage of the power-receiving micro-grid unit, and line impedance between the sending end of the power-sending micro-grid unit and the receiving end of the power-receiving micro-grid unit, may set a target operation point on the power circle diagram based on the magnitude of effective power to be transferred from the power-sending micro-grid unit to the power-receiving micro-grid unit, and may calculate the target phase difference between the power-sending end of the power-sending micro-grid unit and the power-receiving end of the power-receiving micro-grid unit based on the target operation point.

In FIG. 7, the X-axis denotes effective power (P), the Y-axis denotes ineffective power (Q), the reference numeral 701 denotes a power circle diagram of a power-sending source (power-sending micro-grid unit), and the reference numeral 702 denotes a power circle diagram of a power-receiving source (power-receiving micro-grid unit).

The power circle diagram 701 of the power-sending source has a center position (S) and a radius ($\rho$), and the power circle diagram 702 of the power-receiving source has a center position (R) and a radius ($\rho$) equal to that of the power circle diagram 701 of the power-sending source. Here, S, R, and $\rho$ may be obtained from the following Equations 1 to 3.

$$S = (m' \cdot Es^2, n' \cdot Es^2) \quad \text{[Equation 1]}$$

$$R = (-m \cdot Er^2, -n \cdot Er^2) \quad \text{[Equation 2]}$$

$$\rho = \frac{Es \cdot Er}{b} \quad \text{[Equation 3]}$$

Variables (Es, Er, m', n', m, n, and b) included in Equation 1 may be obtained as follows. The power of the power-sending source is transferred to the power-receiving source via lines, which may be shown as in FIG. 8. The output-end voltage ($\dot{E}s$) of the power-sending source and the input-end voltage ($\dot{E}r$) of the power-receiving source may be defined as Equation 4 below, and the line impedance parameters may be expressed as Equation 5 below.

$$\dot{E}r = Er \angle 0, \; \dot{E}s = Es \angle \delta \quad \text{[Equation 4]}$$

$$\dot{E}s = \dot{A} \cdot \dot{E}r + \dot{B} \cdot \dot{I}r \quad \text{[Equation 5]}$$

$$\dot{I}s = \dot{C} \cdot \dot{E}r + \dot{D} \cdot \dot{I}r$$

Variables (m', n', m, n, and b) used in Equations 1 to 3 may be obtained from the line impedance parameters through Equations 6 to 8.

$$\frac{\dot{A}}{\dot{B}} = m - j \cdot n \quad \text{[Equation 6]}$$

$$\frac{\dot{D}}{\dot{B}} = m' - j \cdot n' \quad \text{[Equation 7]}$$

$$\frac{1}{\dot{B}} = \frac{1}{b} \angle -\beta \quad \text{[Equation 8]}$$

Referring back to FIG. 7, the operation points of the power-sending source and the power-receiving source may be analyzed on the power circle diagram. The operation point (A) of the power-sending source may be obtained by drawing a line segment (S-S') passing through the center (S) at an angle ($\beta$) with the X-axis in the counterclockwise direction and by rotating the line segment (S-S') by an angle ($\delta$) in the counterclockwise direction about the center (S) so as to meet the circumference at a position (A). The operation point (B) of the power-receiving source may be obtained by drawing a line segment (R-R') passing through the center (R) at an angle ($\beta$) with the X-axis in the counterclockwise direction and by rotating the line segment (R-R') by an angle ($\delta$) in the clockwise direction about the center (R) so as to meet the circumference at a position (B). Here, $\beta$ may be obtained from the line impedance through Equation 8, and $\delta$, which is the phase difference between the power-sending source voltage and the power-receiving source voltage, may be obtained from Equation 4. The effective power transmitted by the power-sending source may be recognized as Ps that is the X-axis component of the operation point (A), and the effective power received by the power-receiving source may be recognized as Pr that is the X-axis component of the operation point (B).

Referring to FIG. 9, it is assumed that the current operation point of the power-sending source is A1 and the current operation point of the power-receiving source is B1. The phase difference between the power-sending source voltage and the power-receiving source voltage is δ1 at the current operation points. If the phase difference between the voltage of the power-sending end and the voltage of the power-receiving end is changed to δ2, the operation point of the power-sending source may be changed to A2 and the operation point of the power-receiving source may be changed to B2. In this case, the effective power transmitted by the power-sending source may be changed from P3 to P4, and the effective power received by the power-receiving source may be changed from P1 to P2. As described above, it is possible to control the effective power transferred between the power-sending source and the power-receiving source by changing the phase difference (δ) between the power-sending source voltage and the power-receiving source voltage while maintaining the magnitudes of the power-sending source voltage and the power-receiving source voltage.

That is, the power circle diagrams of the power-sending source and the power-receiving source may be determined by the line impedance, the magnitude of the power-sending source voltage (Es), and the magnitude of the power-receiving source voltage (Er), and it is possible to control the effective power transferred between the power-sending source and the power-receiving source by changing the phase difference (δ) between the power-sending source voltage and the power-receiving source voltage. Thus, the central power controller may set a target operation point on the power circle diagram based on the effective power to be transferred between the micro-grid units, may compare the current operation point with the target operation point on the power circle diagram at a predetermined time interval, may update the instruction on the phase, and may transmit the same to the power-sending micro-grid unit and the power-receiving micro-grid unit, thereby controlling the effective power transferred between the micro-grid units. According to the above control method, it is possible to supply stable power to the loads because the magnitudes of the power-sending source voltage and the power-receiving source voltage are not required to be changed for power transfer between the power-sending source and the power-receiving source, and a reliability problem due to an increase or decrease in the voltage magnitude can be prevented.

Figure 10:
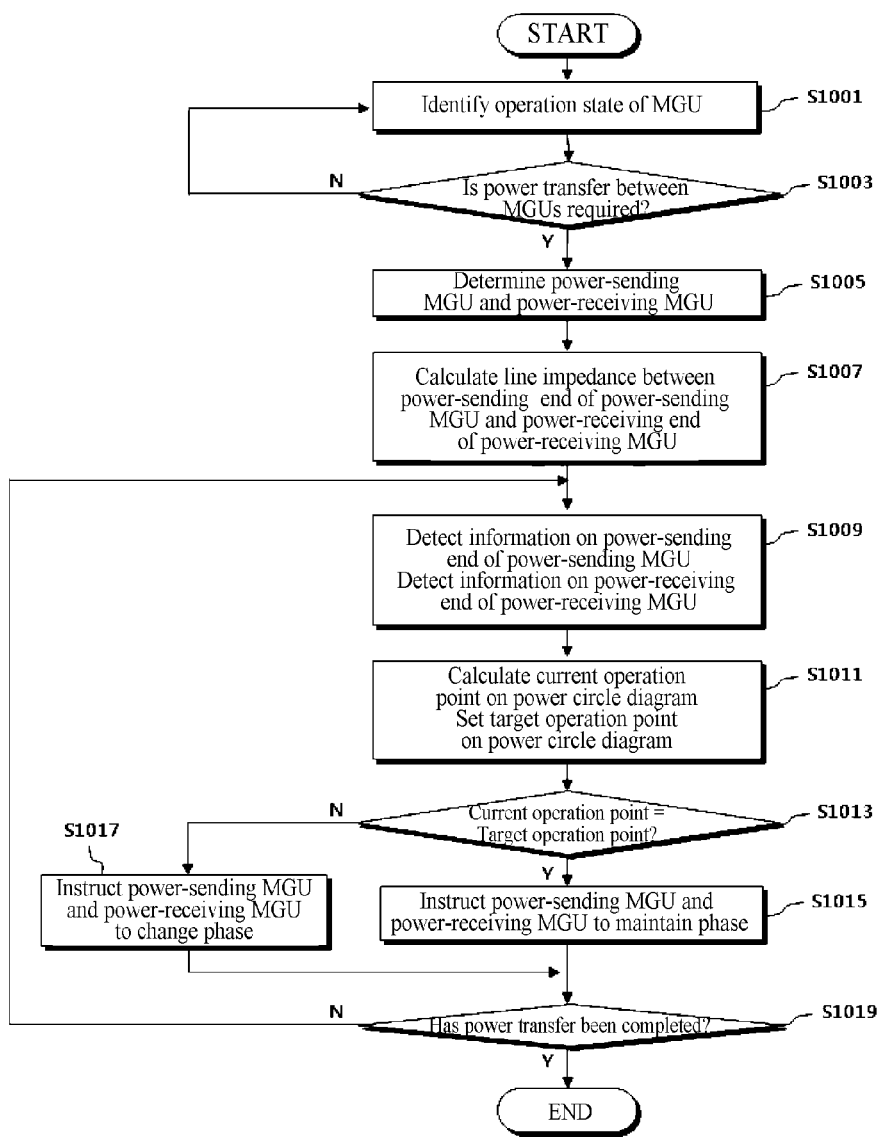
FIG. 10 is a flowchart illustrating a method of controlling power transfer between micro-grid units using a power circle diagram.

Next, a procedure in which the central power controller controls the effective power transferred between the micro-grid units using the power circle diagram will be described with reference to FIG. 10.

First, the central power controller may identify the operation states of micro-grid units (MGUs) in step S1001. For example, the operation state of a micro-grid unit may include information on the voltage, frequency, power, and accident situation of the micro-grid unit.

In step S1003, the central power controller may determine whether or not power transfer between the micro-grid units is required. For example, when there is a power shortage in the micro-grid unit or when an accident occurs in the micro-grid unit, power transfer may be required between the micro-grid units. If it is determined that power transfer is required between the micro-grid units in step S1003, the process proceeds to step S1005. Otherwise, the process may return to step S1001.

In step S1005, the central power controller may determine a power-sending micro-grid unit to transmit power and a power-receiving micro-grid unit to receive power. For example, a micro-grid unit lacking power may be determined as a power-receiving micro-grid unit, and a micro-grid unit adjacent to the power-receiving micro-grid unit, among the micro-grid units having sufficient power, may be determined as a power-sending micro-grid unit.

In step S1007, the central power controller may calculate line impedance between a power-sending end of the power-sending micro-grid unit and a power-receiving end of the power-receiving micro-grid unit. The line impedance may include the impedance of the external power line. In the case where a standardized external power line is used, the impedance of the external power line may be known in advance, so that the line impedance between the power-sending end of the power-sending micro-grid unit and the power-receiving end of the power-receiving micro-grid unit may be calculated. If necessary, the line impedance may be calculated in consideration of the impedance of the internal power line inside the micro-grid unit, as well as that of the external power line.

As shown in FIG. 2, the micro-grid unit may be connected to external power lines 130 via two power line connecting portions 116a and 116b. The position of the power-sending end or the power-receiving end may vary depending on the fact that the power is transmitted or received through the power line connecting portion 116a or 116b. The determination on the position of the power-sending end or power-receiving end in the micro-grid unit may affect the calculation of the line impedance or the accuracy of the detected voltage. Therefore, it is desirable to calculate the line impedance and to detect the power-sending end/power-receiving end voltage after determining the position of the power-sending end or power-receiving end in the micro-grid unit in consideration of the power transfer direction. However, when a voltage drop or a phase change due to the internal power line (119 in FIG. 2) inside the micro-grid unit is small enough to be negligible, even if the line impedance is calculated or the voltage is detected based on any one of the two power line connecting portions 116a and 116b or based on any position in the internal power line, an error may not occur.

In step S1009, the central power controller may detect information on the power-sending end of the power-sending micro-grid unit and information on the power-receiving end of the power-receiving micro-grid unit. The information on the power-sending end of the power-sending micro-grid unit may contain information on the magnitude and phase of the voltage of the power-sending end. The information on the power-receiving end of the power-receiving micro-grid unit may contain information on the magnitude and phase of the voltage of the power-receiving end.

In step S1011, the central power controller may calculate current operation points of the power-sending micro-grid unit and the power-receiving micro-grid unit on the power circle diagram. To this end, the central power controller may utilize the line impedance, which has been calculated in step S1007, and the information on the power-sending end of the power-sending micro-grid unit and information on the power-receiving end of the power-receiving micro-grid unit, which have been detected in step S1009. The current operation points on the power circle diagram may be calculated according to the contents described above with reference to FIGS. 7 to 9. In addition, the central power controller may set a target operation point on the power circle diagram in step S1011. To this end, the central power controller may determine the effective power to be transferred from the power-sending micro-grid unit to the power-receiving micro-grid unit, and may set a target operation point based on the determined effective power.

In step S1013, the central power controller may determine whether or not the current operation point obtained in step S1011 matches the target operation point. If the current operation point matches the target operation point, the central power controller may proceed to step S1015 so as to instruct the power-sending micro-grid unit and the power-receiving micro-grid unit to maintain the current phase. If the current operation point does not match the target operation point, the central power controller may proceed to step 1017 so as to instruct the power-sending micro-grid unit and the power-receiving micro-grid unit to change the phase.

As described above, if the target operation point is determined on the power circle diagram, the target phase difference between the voltage of the power-sending end of the power-sending micro-grid unit and the voltage of the power-receiving end of the power-receiving micro-grid unit may be determined. The central power controller may transmit an instruction on the phase to the power-sending micro-grid unit and the power-receiving micro-grid unit such that the phase difference between the voltage of the power-sending end of the power-sending micro-grid unit and the voltage of the power-receiving end of the power-receiving micro-grid unit becomes the target phase difference.

In step S1019, the central power controller may determine whether or not power transfer between the power-sending micro-grid unit and the power-receiving micro-grid unit has been completed. If it is determined that the power transfer is required to be continued, the central power controller may return to step S1009, and if it is determined that the power transfer has been completed, the central power controller may terminate the power transfer procedure.

Figure 11:
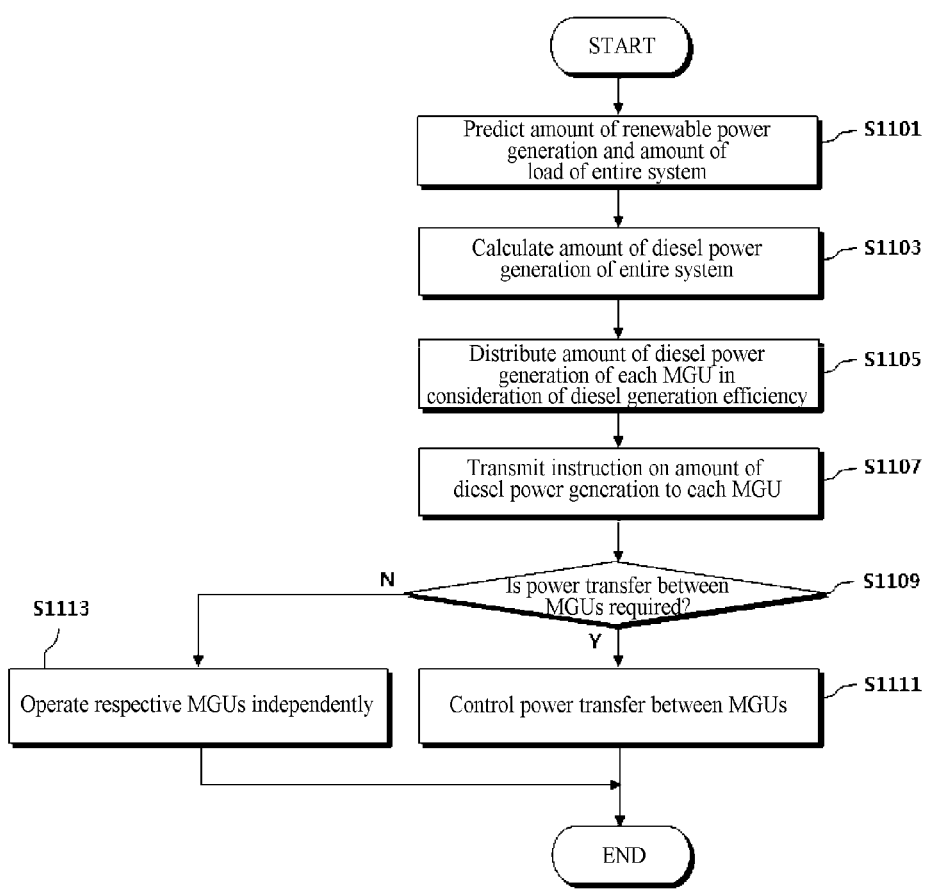
FIG. 11 is a flowchart illustrating a control method for reducing diesel fuel consumption.

FIG. 11 is a flowchart illustrating a control method for reducing diesel fuel consumption.

The respective micro-grid units may be connected to diesel generators that generate power using fuel in case of power shortages of renewable generators. The mobile micro-grid system, such as a micro-grid system for military purposes, must be operated reliably as long as possible while using a limited amount of fuel. To this end, the central power controller may determine the amount of power generation of the diesel generator connected to each of the micro-grid units, and may transmit an instruction thereon to the respective micro-grid units for efficient use of the fuel in the diesel generators.

Referring to FIG. 11, in step S1101, the central power controller may predict the amount of power generation of renewable generators and the amount of load in the entire micro-grid system. To this end, the central power controller may obtain, from the micro-grid units, information on the renewable generators and loads connected to the respective micro-grid units.

In step S1103, the central power controller may calculate the amount of diesel power generation of the entire micro-grid system. For example, the central power controller may calculate the total amount of power generation of the diesel generators in consideration of the amount of power generation of renewable generators and the amount of load, which have been predicted in step S1101. The central power controller may further consider the amount of power stored in the energy storage device connected to each micro-grid unit in order to calculate the amount of power generation of the diesel generator.

In step S1105, the central power controller may distribute the amount of power generation of each diesel generator connected to the respective micro-grid units. For example, the central power controller may consider the efficiency depending on the output of each diesel generator in order to determine the amount of power generation of each diesel generator. Since the diesel generator may vary in efficiency depending on output, the central power controller may determine the power generation of each diesel generator in consideration of the fuel consumption efficiency of the entire micro-grid system. For example, some of the diesel generators may operate at optimum efficiency, and others thereof may stop generating power or operate at a minimum output.

The fuel consumption of the entire micro-grid system may be reduced in the case where the central power controller determines the amount of power generation (i.e., output) of each diesel generator in consideration of the efficiency of the diesel generator, compared to the case where each micro-grid unit determines the amount of power generation of the diesel generator itself in consideration of the internal power situation. However, in the present embodiment, power transfer between the micro-grid units may be required due to a power shortage in the respective micro-grid units. Therefore, the central power controller may further consider the loss due to power transfer between the micro-grid units when determining the amount of power generation of each diesel generator.

In step S1107, the central power controller may transmit an instruction on the amount of power generation of each diesel generator to the respective micro-grid units. The respective micro-grid units may transmit, to the corresponding diesel generators, information on the amount of power generation received from the central power controller. The respective diesel generators may generate electric power according to the information on the amount of power generation received from the micro-grid units.

In step S1109, the central power controller may determine whether or not power transfer between the micro-grid units is required. As described above, in the present embodiment, the amount of power generation of each diesel generator is determined in order to improve the fuel consumption efficiency of the entire micro-grid system, instead of determining the amount of power generation of each diesel generator according to the internal power situation of each micro-grid unit. Therefore, there may be a power shortage in the respective micro-grid units. Considering this situation, the central power controller may predict the power shortage of each micro-grid unit, and may determine whether or not power transfer between the micro-grid units is required.

If it is determined that power transfer between the micro-grid units is required in step S1109, the central power controller may proceed to step S1111 so as to control power transfer between the micro-grid units. In this case, a power transfer procedure between the micro-grid units, which has been described with reference to FIG. 10, may be performed. If it is determined that power transfer between the micro-grid units is not required in step S1109, the central power controller may proceed to step S1113 so as to instruct the respective micro-grid units to operate independently.

Figure 12:
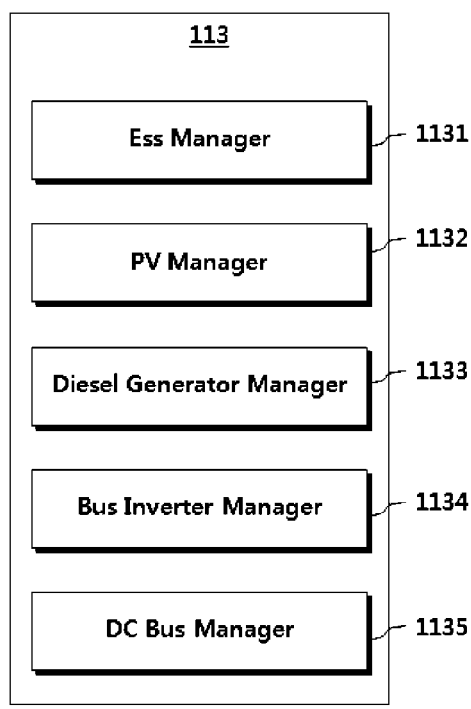
FIG. 12 is a schematic diagram illustrating the configuration of a power management unit.
Figure 13:
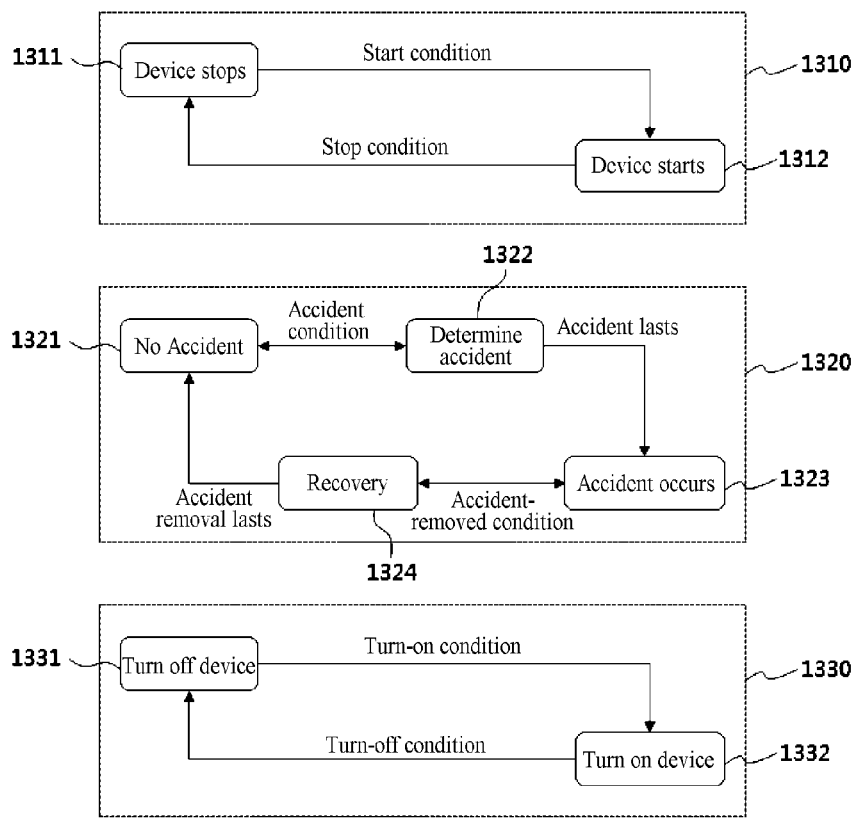
FIG. 13 is a diagram explaining the operation of a power management unit.

Next, the power management unit will be described with reference to FIGS. 2, 12, and 13. FIG. 12 is a schematic diagram illustrating the configuration of a power management unit, and FIG. 13 is a diagram explaining the operation of a power management unit.

Referring to FIG. 12, the power management unit 113 may selectively include an ESS manager 1131, a PV manager 1132, a diesel generator manager 1133, a bus inverter manager 1134, and a DC bus manager 1135.

The ESS manager 1131 may control the energy storage device (ESS) and the ESS DC/DC converter 111d. For example, the ESS manager 1131 may perform start, stop, operation, and accident management functions of the energy storage device (ESS) and the ESS DC/DC converter 111d.

The PV manager 1132 may control the photovoltaic generator (PV) and the photovoltaic DC/DC converter 111c. For example, the PV manager 1132 may perform start, stop, operation, and accident management functions of the photovoltaic generator (PV) and the photovoltaic DC/DC converter 111c.

The diesel generator manager 1133 may control the diesel generators (Diesel 1 and Diesel 2) and the diesel AC/DC converters 111a and 111b. For example, the diesel generator manager 1133 may perform start, stop, operation, and accident management functions of the diesel generators (Diesel 1 and Diesel 2) and the diesel AC/DC converters 111a and 111b.

The bus inverter manager 1134 may control the bus DC/AC converter 112. For example, the bus inverter manager 1134 may perform start, stop, operation, and accident management functions of the bus DC/AC converter 112.

The DC bus manager 1135 may manage the DC bus 118. For example, the DC bus manager 1135 may analyze the voltage state of the DC bus 118 to identify a steady state and a dynamic state, thereby determining whether or not an accident has occurred.

The power management unit 113 may be implemented as a program or firmware, which operates in a microprocessor, a CPU, a DSP, a system on chip (SoC), or the like.

FIG. 13 schematically illustrates management functions of the respective managers (the ESS manager 1131, the PV manager 1132, the diesel generator manager 1133, the bus inverter manager 1134, and a DC bus manager 1135) of the power management unit 113.

The respective managers of the power management unit 113 may include all of some of a start management function 1310, an accident management function 1320, and an operation management function 1330. The respective managers of the power management unit 113 may perform the above management functions internally and/or in parallel therewith. For example, the PV manager 1132 may simultaneously perform the three management functions in parallel while the ESS manager 1131 simultaneously performs the three management functions in parallel.

The start management function 1310 may determine whether to start (1312) or stop (1311) the device in consideration of a start condition of the device and a stop condition of the device. Here, "device" may be a target device managed by each manager of the power management unit 113. For example, the device managed by the ESS manager 1131 may be the ESS DC/DC converter 111d.

The accident management function 1320 may determine whether or not an accident condition has been established through the accident determination 1322. If an accident condition has not been established, the accident management function 1320 may proceed to the no-accident state 1321, and if the state in which the accident condition has been established lasts for a predetermined period of time (e.g., 3 seconds), the accident management function 1320 may proceed to the accident occurrence state 1323. If an accident-removed condition is established in the accident occurrence state 1323, the accident management function 1320 may proceed to the recovery state 1324, and if the recovery state 1324 lasts for a predetermined period of time (e.g., 4 seconds), the accident management function 1320 may proceed to the no-accident state 1321.

The operation management function 1330 may determine to turn on (1332) or off (1331) the device in consideration of a turn-on condition of the device and a turn-off condition of the device. For example, the device stop 1311 and device start 1312 of the start management function 1310 may be an operation of turning on/off the hardware of the device, and the device turn-off 1331 and the device turn-on 1332 of the operation management function 1330 may be whether or not to activate a control function of the device.

For example, the ESS manager 1131 may include all of the start management function 1310, the accident management function 1320, and the operation management function 1330. For example, the ESS manager 1131 may consider, as a start/stop condition, whether or not an accident has occurred in the energy storage device and the voltage of the energy storage device, may consider, as a turn-on/off condition, whether or not an accident has occurred in the energy storage device and whether or not the energy storage device has started, and may consider, as an accident/accident-removed condition, whether or not an accident has occurred in the energy storage device and the ESS DC/DC converter 111d.

For example, the PV manager 1132 may include all of the start management function 1310, the incident management function 1320, and the operation management function 1330. For example, the PV manager 1132 may consider, as a start/stop condition, whether or not the energy storage device is in operation and the DC bus voltage state, may consider, as a turn-on/off condition, whether or not an accident has occurred in the photovoltaic generator (PV), whether or not the photovoltaic generator (PV) has started, and the state of charge (SOC) of the energy storage device, and may consider, as an accident/accident-removed condition, whether or not there is a malfunction in the photovoltaic generator (PV) and the photovoltaic DC/DC converter 111c.

For example, the diesel generator manager 1133 may include all of the start management function 1310, the incident management function 1320, and the operation management function 1330. For example, the diesel generator manager 1133 may consider, as a start/stop condition, whether or not the energy storage device is in operation and the DC bus voltage state, may consider, as a turn-on/off condition, whether or not an accident has occurred in the diesel generators (Diesel 1 and Diesel 2), the state of charge (SOC) of the energy storage device, and net load thereof, and may consider, as an accident/accident-removed condition, whether or not there is a malfunction in the diesel generators (Diesel 1 and Diesel 2) and the diesel AC/DC converters 111a and 111b.

For example, the bus inverter manager 1134 may include all of the start management function 1310, the incident management function 1320, and the operation management function 1330. For example, the bus inverter manager 1134 may consider, as a start/stop condition, whether or not the energy storage device is in operation and the DC bus voltage state, may consider, as a turn-on/off condition, whether or not an accident has occurred in the bus DC/AC converter 112 and whether or not the bus DC/AC converter 112 has started, and may consider, as an accident/accident-removed condition, whether or not there is a malfunction in the bus DC/AC converter 112.

For example, the DC bus manager 1135 may include the accident management function 1320. For example, the DC bus manager 1135 may analyze the voltage state of the DC bus 118. If the voltage state is determined to be a steady state, the DC bus manager 1135 may proceed to the no-accident state 1321, and if a dynamic state lasts for a predetermined period of time (e.g., 2 seconds), the DC bus manager 1135 may determine that it is in the accident occurrence state (1323). When the voltage of the DC bus 118 is changed from the accident occurrence state 1323 to the steady state, the DC bus manager 1135 may proceed to the recovery state 1324, and if the recovery state 1324 lasts for a predetermined period of time (e.g., 2 seconds), the DC bus manager 1135 may proceed to the no-accident state. That is, the DC bus manager 1135 may determine, as an accident condition, whether the voltage of the DC bus 118 is in the steady state or dynamic state. The accident determined by the DC bus manager 1135 may be understood to have a broad meaning encompassing the case where the dynamic state lasts for a predetermined period of time, as well as an actual accident.

As described above, the power management unit 113 may include various managers, such as the ESS manager 1131, the PV manager 1132, the diesel generator manager 1133, the bus inverter manager 1134, and a DC bus manager 1135, and the respective managers of the power management unit 113 may include all or some of the start management function 1310, the accident management function 1320, and the operation management function 1330 shown in FIG. 13. The respective management functions 1310, 1320, and 1330 performed by the respective managers of the power management unit 113 are simultaneously performed in parallel with each other and are mutually organized such that the operation state of each management function acts as an operation condition for another management function, thereby enabling efficient management of the entire system.

As described hitherto, it is possible according to the embodiment of the present disclosure to provide a mobile micro-grid system that enables easy construction of a movable system, operates stably, and improves fuel consumption efficiency of a generator.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A mobile micro-grid system comprising:
   two or more movable micro-grids configured to receive energy from an energy source so as to supply the energy to an internal power line of the corresponding micro-grid and configured to provide the energy of the internal power line to loads;
   external power lines configured to be connected between the micro-grids; and
   a central power controller configured to manage power of the mobile micro-grid system,
   wherein the external power lines are connected to each other through the internal power lines so as to form a closed-loop type ring bus,
   wherein the central power controller is configured to calculate a target phase difference between a power-sending micro-grid and a power-receiving micro-grid among the two or more micro-grids and to transmit an instruction on a phase to the power-sending and power-receiving micro-grids when it is determined that power transfer between the power-sending and power-receiving micro-grids is required, and
   wherein the central power controller is configured to calculate the target phase difference by:
   determining the power-sending micro-grid and the power-receiving micro-grid among the two or more micro-grids,
   calculating a current operation point on a power circle diagram using information on a sending-end voltage of the power-sending micro-grid, a receiving-end voltage of the power-receiving micro-grid, and line impedance between a sending end of the power-sending micro-grid and a receiving end of the power-receiving micro-grid,
   setting a target operation point on the power circle diagram based on a magnitude of effective power to be transferred from the power-sending micro-grid to the power-receiving micro-grid, and
   calculating the target phase difference between the sending end of the power-sending micro-grid and the receiving end of the power-receiving micro-grid based on the target operation point.

2. The mobile micro-grid system of claim 1, wherein each of the micro-grids is provided with two power line connectors configured to be connected with the external power lines, and
   wherein the internal power line connects the two power line connectors to each other.

3. The mobile micro-grid system of claim 2, wherein the two power line connectors are connected to different external power lines, respectively.

4. The mobile micro-grid system of claim 1, wherein each of the micro-grids is configured to convert the energy supplied from the energy source to DC, to convert the same to AC, and to then supply the same to the internal power line.

5. The mobile micro-grid system of claim 4, wherein each of the micro-grids comprises:
   a diesel AC/DC converter configured to receive the energy from a diesel generator and to provide the same to a DC bus;
   a photovoltaic DC/DC converter configured to receive the energy from a photovoltaic generator and to provide the same to the DC bus;
   an ESS DC/DC converter configured to transfer the energy between an energy storage device and the DC bus in both directions; and
   a bus DC/AC converter configured to transfer the energy between the DC bus and the internal power line.

6. The mobile micro-grid system of claim 1, wherein the central power controller is configured to compare the current operation point with the target operation point on the power circle diagram at a predetermined time interval and is configured to transmit the instruction on the phase to the power-sending and power-receiving micro-grids.

7. The mobile micro-grid system of claim 1, wherein the respective micro-grids are connected to diesel generators, and wherein the central power controller transmits an instruction on the amount of power generation of each diesel generator to the micro-grids.

8. The mobile micro-grid system of claim 7, wherein the central power controller is configured to:
   predict an amount of power generation of renewable generators and an amount of load power in the entire system,
   calculate a total amount of power generation of the diesel generators based on the amount of power generation and the amount of load power, which have been predicted, and
   determine distribution for the amount of power generation of each diesel generator of the micro-grids in consideration of power generation efficiency of each diesel generator.

9. A mobile micro-grid comprising:
   an energy source connector configured to be connected to an energy source;
   an energy source power converter configured to convert and transfer power between the energy source and a DC bus;
   two power line connectors configured to be connected to an external power line;
   an internal power line configured to connect the two power line connectors to each other;
   a bus DC/AC converter configured to transfer the power between the DC bus and the internal power line;
   a load connector configured to be connected to the internal power line so as to supply the power to loads; and
   a power manager configured to receive an instruction on power control from an external central power controller and configured to control the bus DC/AC converter,
   wherein the central power controller is configured to calculate a target phase difference between a power-sending micro-grid and a power-receiving micro-grid and to transmit an instruction on a phase to the power-sending and power-receiving micro-grids when it is determined that power transfer between the power-sending and power-receiving micro-grids is required, and
   wherein the central power controller is configured to calculate the target phase difference by:
   determining the power-sending micro-grid and the power-receiving micro-grid,
   calculating a current operation point on a power circle diagram using information on a sending-end voltage of the power-sending micro-grid, a receiving-end voltage of the power-receiving micro-grid, and line impedance between a sending end of the power-sending micro-grid unit and a receiving end of the power-receiving micro-grid unit,
   setting a target operation point on the power circle diagram based on a magnitude of effective power to be transferred from the power-sending micro-grid to the power-receiving micro-grid, and
   calculating the target phase difference between the sending end of the power-sending micro-grid and the receiving end of the power-receiving micro-grid based on the target operation point.

10. The mobile micro-grid of claim 9, wherein the energy source connector comprises:
   a diesel connector configured to be connected to a diesel generator;
   a photovoltaic connector configured to be connected to a photovoltaic generator; and
   an ESS connector configured to be connected to an energy storage device.

11. The mobile micro-grid of claim 10, wherein the energy source power converter configured to provide the power supplied from the energy source to the DC bus comprises:
   a diesel AC/DC converter configured to be connected between the diesel connector and the DC bus;
   a photovoltaic DC/DC converter configured to be connected between the photovoltaic connector and the DC bus; and
   an ESS DC/DC converter configured to transfer energy between the ESS connector and the DC bus in both directions.

12. The mobile micro-grid of claim 9, wherein the load connector comprises:
   a three-phase load connector configured to be connected to a three-phase AC load;
   a single-phase load connector configured to be connected to a single-phase AC load; and
   a DC load connector configured to be connected to a DC load.

13. The mobile micro-grid of claim 12, wherein an AC/DC converter is disposed between the internal power line and the DC load connector.

14. The mobile micro-grid of claim 9, wherein the micro-grid is connected to another micro-grid via the external power line connected to the power line connector.

15. The mobile micro-grid of claim 9, wherein the power manager is configured to receive an instruction on a voltage phase from the central power controller, and is configured to control the bus DC/AC converter such that a voltage phase of the internal power line conforms to the instruction on the voltage phase of the central power controller.

16. The mobile micro-grid of claim 9, wherein the energy source comprises a diesel generator, and
   wherein the power manager is configured to receive an instruction on an amount of power generation of the diesel generator from the central power controller and configured to transmit, to the diesel generator, information on the amount of power generation.

* * * * *